Sept. 2, 1958 R. B. COOPER 2,850,327
SPRAYING APPARATUS NOZZLE
Filed May 28, 1953 2 Sheets-Sheet 1

INVENTOR
ROBERT B. COOPER

BY Jewett, Mead, Browne
& Schuyler
ATTORNEYS

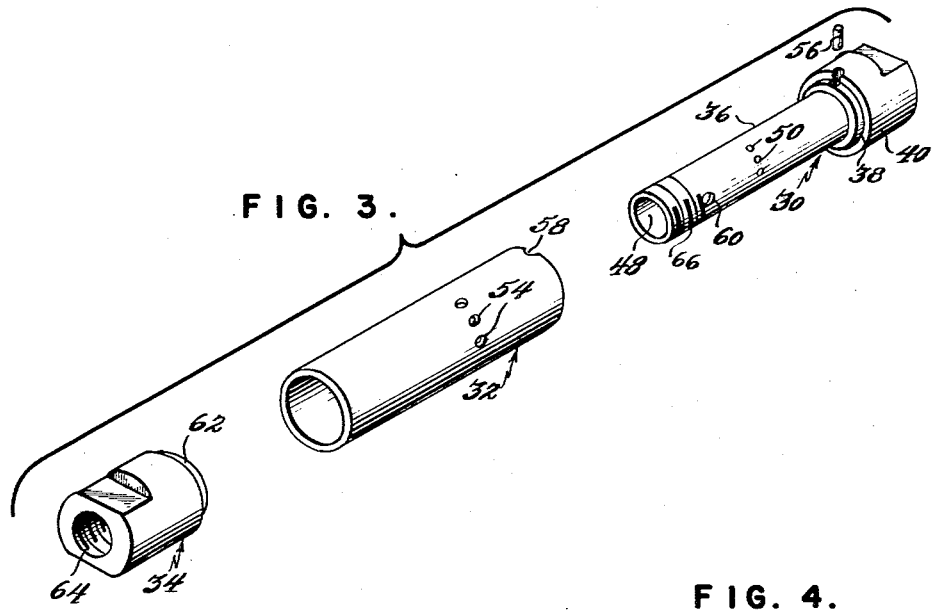
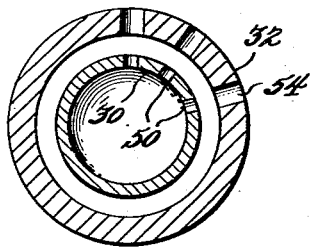
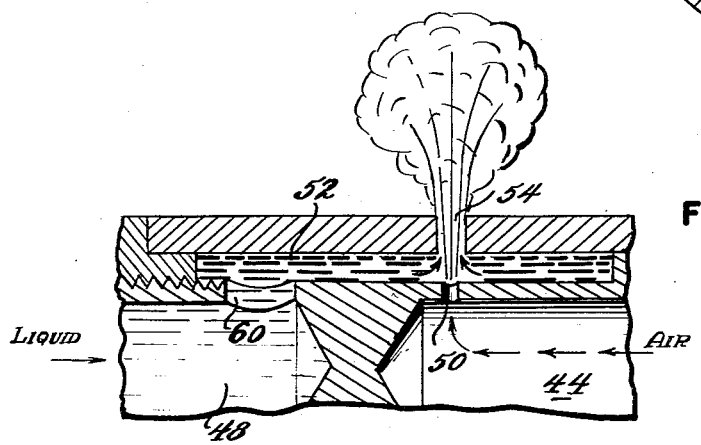

United States Patent Office 2,850,327
Patented Sept. 2, 1958

2,850,327

SPRAYING APPARATUS NOZZLE

Robert Britt Cooper, Ithaca, N. Y., assignor to United Co-Operatives, Inc., Alliance, Ohio, a corporation of Indiana Application May 28, 1953, Serial No. 357,973

4 Claims. (Cl. 299—140)

This invention relates to spraying apparatus and more particularly to a low-pressure spraying apparatus embodying, as a part thereof, a spray nozzle of the nebulizing type. The spraying apparatus of my invention has particular utility in connection with the spraying of livestock with insecticide liquids but is not necessarily restricted to such use.

There is a need on most farms for a spraying apparatus for use in spraying farm animals with insecticide liquids which act as an insect repellant. However, most of the spraying apparatus presently available for this purpose are relatively expensive and complicated.

While it is known to have a spraying means actuated by passage of an animal adjacent thereto, so far as we know there are no spraying arrangements in which the physical passage of an animal adjacent the spraying apparatus supplies the energy for the spraying operation. It can be understood that a spraying system in which the source of motive power is the animal to be sprayed only requires a low capital investment and would have a minimum operating expense. However, it can also be appreciated that such a spraying system, having a limited power source, must operate at optimum efficiency so as to make most efficient use of the energy delivered to it.

Furthermore, most of the presently available spraying arrangements use positive displacement high-pressure liquid pumps which are a cause of various operating disadvantages. For example, a disadvantage commonly associated with spraying systems having a positive displacement liquid pumping means is that there is frequently a dribble from the spray nozzle after completion of the spraying operation. A further disadvantage associated with the high-pressure spraying apparatus commonly employed is the fact that the nozzle orifices associated with such apparatus are generally very small in size, with the result that the orifices become very easily clogged with dirt and foreign matter.

It is desirable that the spraying nozzle used in conjunction with any spraying apparatus be capable of easy disassembly in order to permit cleaning the interior of the nozzle.

Accordingly, it is an object of this invention to provide a spraying apparatus which is relatively inexpensive and simple in construction and operation.

It is a further object of this invention to provide a spraying apparatus adapted to be operated by the physical passage adjacent the spraying apparatus of a subject to be sprayed.

It is a still further object of this invention to provide a spraying apparatus having no after dribble.

It is another object of this invention to provide as part of a spray assembly a spray nozzle which is rugged in construction and easily disassembled for cleaning.

Another object of this invention is to provide a spray assembly which does not require a spray nozzle having very small orifices.

Another object of this invention is to provide as part of a spraying assembly a spray nozzle which efficiently uses the energy in the air stream supplied to it for lifting a liquid from its container and atomizing it.

In accordance with these objectives, this invention provides a spraying apparatus comprising an air pump means adapted to be mechanically operated by the physical passage of a subject to be sprayed adjacent the spraying apparatus, a liquid supply reservoir, and a spraying nozzle connected at one of its ends to the air pump and at the other of its ends to the liquid supply. The nozzle is an important feature of the combination and is so constructed as to utilize to the maximum extent the low-pressure air supply from the air pump. Upon actuation of the air pump by a subject to be sprayed, air is delivered to an annular chamber within the nozzle in such manner as to create a suction which draws up liquid from the liquid reservoir which is in communication with the annular chamber. The liquid and air are then ejected in the form of a spray through orifices in the outer wall of the annular chamber.

The features of this invention which I believe to be novel are set forth with particularity in the appended claims. My invention itself however, both as to its organization and use, together with further objects and advantages thereof, may best be understood by reference to the following description taken in connection with the accompanying drawings in which:

Fig. 3 is an exploded view showing the components of my nozzle assembly in accordance with a preferred embodiment of my invention;

Fig. 4 is an enlarged view in transverse section along line 4—4 of Fig. 2; and

Fig. 5 is an enlarged fragmentary longitudinal sectional view of the spray nozzle of my invention illustrating its manner of operation.

Figure 1:
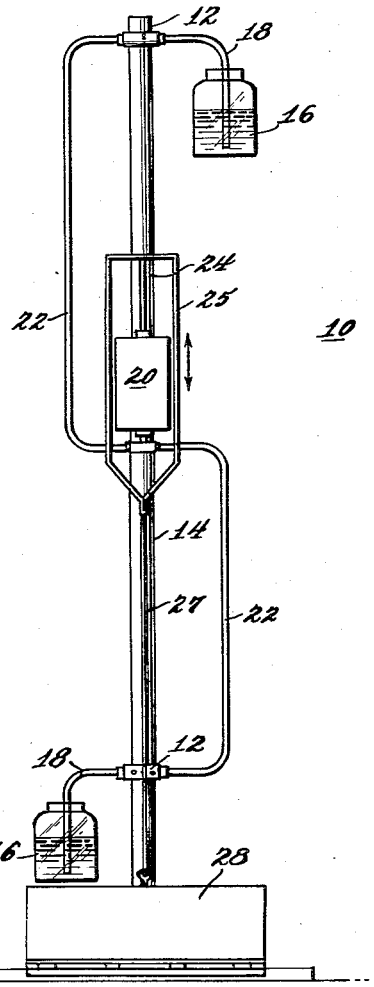
Fig. 1 is a front elevation of a spraying apparatus in accordance with my invention.

Referring now to the drawings, and more particularly to Fig. 1, the spraying apparatus of my invention, generally indicated at 10, comprises a pair of nozzles 12 which are respectively disposed and secured in any suitable manner adjacent the upper and lower ends of a standard or support member 14. Each of the nozzles 12 is connected at one of its ends to a liquid container or reservoir 16, each of the respective reservoirs being positioned at a level below that of its respective nozzle so that the highest level which the liquid can attain in either of the containers 16 will always be lower than the level of the respective nozzle 12 with which it communicates. This arrangement prevents any gravity flow of the liquid from the container. The liquid inlet end of each respective nozzle 12 is connected to its respective container by means of a conduit 18 having a right angle bend which permits it to extend down into the interior of the container. The distance of the liquid container 16 below the nozzle 12 should be adjusted in accordance with the rating of the treadle-operated air pump means to be described to insure that the liquid is properly raised from the container upon operation of the air pump.

Figure 1A:
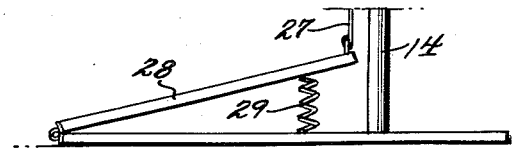
Fig. 1a is an enlarged side elevation of the treadle device of Fig. 1.

A common source of air supply for the two nozzles 12 in the form of a low-pressure air pump 20 is supported by the standard or support member 14 at an intermediate portion of the height of the support. The outlet of the air pump 20 is connected by means of a T connection to the air supply conduits 22 which respectively extend to the air inlet end of each of the respective nozzles 12. The air pump 20 is provided with a piston member 24, the downward movement of which causes a volume of low-pressure air to be expelled from the outlet of the pump into conduits 22. The upper end of piston 24 is connected to a movable yoke member 25 which is connected by a rigid link 27 to the outer end of a treadle member 28 which is normally biased in an upward direction by a spring 29. As will be seen in Fig. 1a, the treadle is angularly inclined transverse of the path of movement of an animal past the spraying apparatus. It can be seen that when the treadle member 28 is actuated in a downward direction, as, for example, due to the passage of an animal across the treadle, the link 27 will be drawn downwardly in such manner as to move piston 24 downwardly in the cylinder of pump 20, thereby supplying a volume of air through conduits 22 to the respective inlet portions of the respective nozzles 12. After the downward pressure on the treadle is released, spring 29 will cause the treadle to return to the elevated position shown in Fig. 1, thereby causing the piston 24 to return to the upper end of the air cylinder due to the upward movement of link 27 and yoke 25.

The apparatus shown in Fig. 1 has particular utility in connection with the spraying of cattle with insecticide solutions, since the apparatus 10, including the treadle 28, may be positioned along a path which the animal is caused to follow so that when the animal depresses treadle 28, he will be sprayed on one side from above and below by the nozzles 12. The animal then makes a return trip past the spraying apparatus, moving in the opposite direction, and again actuates the treadle so that the insecticide solution is applied to the opposite side of the animal. While I have shown only one nozzle positioned at each end of the standard 14, obviously a plurality of nozzles could be used instead.

Referring now more particularly to Figs. 2–5, inclusive, it will be seen that each of the nozzle devices 12, in accordance with the preferred embodiment of my invention, comprises an air inlet member generally designated as 30, an outer sleeve member 32 adapted to surround the air inlet member 30, and a liquid inlet member 34 adapted to engage the outer end of sleeve member 32, or left-hand end with respect to the view shown in the drawings.

The greater portion of the length of member 30 is formed of a tubular portion 36 having a cylindrical outer surface of a diameter sufficiently less than that of the internal diameter of sleeve 32 to provide an annular chamber between the outer surface of portion 36 and the inner surface of sleeve 32 when the nozzle is assembled. For example, the outer diameter of portion 36 may be approximately 80 percent of the inner diameter of sleeve 32. Member 30 is provided with an enlarged cylindrical portion 38 adjoining portion 36 and extending for a relatively short distance longitudinally of member 30 and having an external diameter just slightly less than the internal diameter of sleeve 32. Portion 38 serves as a bearing for sleeve 32 when the nozzle is assembled. The outer end of member 30, the right-hand end with respect to the view shown in the drawings, is provided with a portion 40 having a cylindrical exterior surface of a diameter equal to that of the external diameter of sleeve 32.

Figure 2:
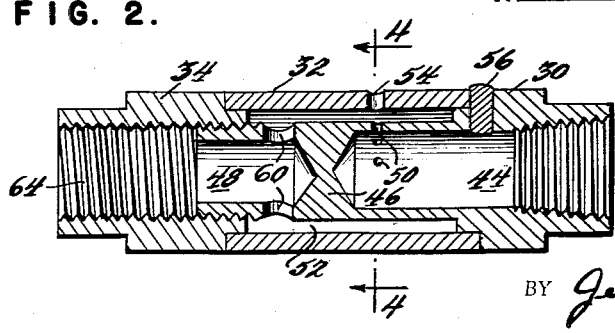
Fig. 2 is an enlarged view in longitudinal section of the spray nozzle of my invention.

As will best be seen in Fig. 2, the air inlet member 30 is provided with an axially drilled passage 44 which extends inwardly from an opening at its right-hand end, with respect to the view shown in the drawings, the open end of passage 44 being internally threaded to permit engagement with the end of conduit 22. Axially drilled passage 44 extends for more than half the length of member 30 but is interrupted by a transverse wall or barrier 46 intermediate of the length of the cylindrical portion 36 of member 30. A second axially drilled passage 48 to communicate with liquid inlet member 34 extends from an opening at the opposite end of member 30, the left-hand end with respect to the view shown in the drawings, to the opposite or left-hand face of transverse wall portion 46. The outer surface of member 30 adjacent the opening of axial passage 48, the left-hand end with respect to the view shown in the drawings, is threaded to engage the internally threaded end of member 34.

The member 30 is provided with a plurality of air orifices 50 which provide communication between the interior of axially drilled passage 44 and the exterior cylindrical surface of portion 36. In the embodiment shown, the orifices 50 are all disposed on the same circumferential line, and therefore all of the orifices shown lie in the same plane transverse of the longitudinal axis of member 30. However, the circumferential arrangement is not critical and the orifices 50 might be axially displaced from each other. Since the nozzle assembly illustrated is for use with the livestock spraying apparatus illustrated in Fig. 1, the orifices 50 are positioned on only one side of the nozzle, namely the side directed toward the animal being sprayed. However, for other types of applications, the orifices might be distributed over a greater portion of the circumference of the nozzle.

The sleeve member 32 is substantially equal in length to the cylindrical portion 36 of member 30 and is adapted to be coaxially positioned about the external surface of portion 36 in such manner as to form an annular chamber 52 between the outer surface of cylindrical portion 36 and the interior wall surface of sleeve member 32.

Sleeve member 32 is provided with a plurality of spray orifices 54 which are equal in number to the orifices 50 of member 30 and are so spaced as to be substantially in radial registration with the orifices 50 of the air inlet member 30 when the nozzle is assembled. By "radial registration," I mean that each orifice 54 is coaxial with an orifice 50 about the same radial line, each orifice preferably being cylindrical in shape, with the longitudinal axis of each orifice lying on a radial line drawn from the common axis of members 30 and 32. The registration of orifices 54 with orifices 50 is essential to efficient operation. The spray orifices 54 should be larger than the air orifices 50 to accommodate the expanded air stream without impeding it, and yet sealing the opening against inward air leakage.

To insure registration of the orifices 54 with the orifices 50, a keying means is provided between members 30 and 32 to insure that these members are maintained in a fixed position with respect to each other when the spray nozzle is assembled. The keying means may comprise a cylindrical pin member 56 fastened in the member 30 and extending radially outwardly therefrom in such manner as to lie half in portion 38 and half in portion 40. The end of sleeve 32 is provided with a cut-out portion 58 adapted to engage the semi-cylindrical portion of pin 56 extending radially outwardly from portion 38. The cut-out portion 58 is so located that when member 32 is positioned coaxially of and surrounding member 30, with cut-out portion 58 engaging pin 56, the orifices 50 of member 30 and the orifices 54 of member 32 will be in radial registration with each other.

The end of member 30 containing the axially drilled passage 48 is provided with a pair of diametrically opposed apertures 60 of substantially larger diameter than the apertures 50 and 54. Apertures 60 provide communication between the interior of axially drilled passage 48, which communicates with liquid inlet member 34, and the annular chamber 52 surrounding the outer cylindrical surface of portion 36 of member 30.

The liquid inlet member 34 has an outer diameter for the greater portion of its length equal to the outer diameters of sleeve member 32 and of portion 40 of member 30. Member 34 is also provided with a short longitudinally extending portion 62 of reduced diameter corresponding to the inner diameter of sleeve 32. Portion 62 serves as a seat or bearing for the end of member 32 when the nozzle is assembled together. Member 34 is provided with an axially drilled passage 64 which is internally threaded to engage the threads 66 at the left-hand end, with respect to the view shown in the drawings, of cylindrical portion 36 of member 30.

It can be seen that the parts are assembled by slipping sleeve member 32 about the cylindrical portion 36 of member 30 until the cutaway portion 58 engages the key or pin member 56 and the inner end surface of sleeve member 32 rests upon the reduced cylindrical portion 38 which has an outer diameter just slightly less than the inner diameter of sleeve 32. The orifices 50 of member 30 and the orifices 54 of member 32 will then be in radial registration. With the sleeve member 32 properly seated with respect to member 30, the threaded end portion 66 of member 30 will project slightly beyond the left-hand end of member 32, with respect to the view shown in the drawings. The member 34 may then be screwed onto the threaded portion 66 at the end of member 30 until the inner shoulder of member 34 abuts against the end shoulder of member 32. When this has been done, the nozzle member is completely assembled. The open end of member 34 may then be connected to a source of liquid supply by means of conduit 18 of Fig. 1, and the end 40 of member 30 may be connected to the source of air supply by conduit 22.

The operation of the spray assembly and nozzle of my invention will be understood by reference to Figs. 1 and 5 of the drawings. It will be seen that when the treadle member 28 is depressed, link 27 is pulled downwardly to thereby cause piston member 24 to be forced downwardly into the cylinder of air pump 20. Air is ejected through the outlet end of pump 20 and into each of the conduits 22. The air passes into the axially drilled passage 44 of the member 30 and passes out through radial passages 50 of member 30 into the annular chamber 52, and thence to the orifices of the outer sleeve member 32. In so doing, some of the momentum of the air passing through the radial orifices 50 and 54 is transferred to the air already in the annular space, causing this air to also be drawn along through the orifices 54 of the sleeve member. This causes a pressure drop or vacuum in the annular chamber 52 which causes liquid in reservoir 16 to be drawn up through conduit 18, through nozzle member 34 into drilled passage 48 and thence through openings 60 into annular chamber 52. The liquid is then carried by the air stream outwardly through orifices 54 in sleeve member 32, emerging from the orifices 54 in the form of a spray.

The spray assembly and nozzle arrangement hereinbefore described will operate on a low-pressure air supply which may be as low as one pound per square inch pressure. However, the nozzle assembly will also operate well with high-pressure air. Only a small volume of air at low-pressure is required to operate the nozzle. It will be seen that the nozzle assembly described may be very easily disassembled for cleaning and that it is so arranged that there is a perfect registry of the air and spray orifices upon reassembling of the nozzle device. The nozzle assembly described will suck up its liquid supply from a container positioned on a lower level than the nozzle liquid inlet, when provided with a low air pressure supply. The nozzle arrangement described has no after dribble when the spraying operation is completed since, as soon as the air pressure supplied from air pump 20 has been cut off, there will be no suction in annular chamber 52 to lift liquid from container 16. The orifices 50 and 54 of the nozzle assembly, while small, are nevertheless much larger than orifices generally required with high-pressure spraying equipment and hence are less liable to become clogged. The nozzle construction obtained by providing registration of the air and spray orifices of the members 30 and 32, respectively, utilizes efficiently the energy in the air stream for lifting the liquid from its container and atomizing it. It can be seen, therefore, that I have provided in accordance with my invention a spraying assembly and nozzle construction which are economical to manufacture and to operate, and which are simple in construction and operation. The apparatus of my invention is ideally suited for use in spraying livestock, particularly on small farms where relative economy and simplicity of such an apparatus are important considerations.

While the construction described is the preferred embodiment of my invention, obviously the spray nozzle may be modified in various ways and still fall within the spirit and scope of my invention. For example, the members 32 and 34 could be made as one integral member, with the composite structure resulting from the joining of members 32 and 34 being provided with a threaded counterbore portion at its left-hand end to engage the threaded end 66 of member 30.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

I claim:

1. A spray nozzle comprising a first hollow cylindrical fluid inlet member, barrier means disposed internally of said inlet member intermediate of the length thereof to prevent communication within said member of said ends thereof, a first fluid outlet passage means extending radially from the interior of said member to the outer surface thereof, said first fluid outlet passage means being in communication only with one end of said inlet member, a second fluid outlet passage means extending radially from the interior of said member to the outer surface thereof, said second fluid passage means communicating only with the opposite end of said inlet member, and a second hollow cylindrical member coaxial with and surrounding said first member to form a closed annular chamber about said first member including said first and second radially extending fluid outlet passage means, said second member having radially extending fluid outlet passage means in communication with said first fluid outlet passage means and lying on the same radially extending lines as said first fluid outlet passage means, with means for introducing a first fluid into the end of said first fluid inlet member in communication with said first fluid outlet passage means and for introducing a second fluid into the end of said inlet member in communication with said second fluid outlet passage means.

2. A spray nozzle comprising an elongated hollow tubular body having a first passage at one end for admitting a first fluid, a second passage at its opposite end for admitting a second fluid, and a barrier disposed between and blocking fluid communication between said passages, a second hollow tubular body engaging one end of said first hollow tubular body, said second hollow tubular body being connectible to a fluid source, and a sleeve surrounding a portion of said first hollow tubular body and spaced therefrom to define an annular chamber between said sleeve and said first hollow tubular body, said first hollow tubular body including an opening extending radially from the first passage of said first hollow tubular body for passing said first fluid from said first passage to said annular chamber, said first hollow tubular body also including an opening extending radially from the second passage of said first hollow tubular body for passing said second fluid from said second passage to said annular chamber, and said sleeve including an opening positioned in radial registration with the opening in said first hollow tubular body which is in communication with the first passage of said first hollow tubular body whereby said first fluid admitted to said annular chamber may entrain said second fluid and discharge the mixed fluids through said sleeve opening.

3. A spray nozzle according to claim 2, wherein said second hollow tubular body engages one end of said sleeve to maintain said sleeve in position against a shoulder on said first hollow tubular body.

4. A spray nozzle according to claim 2, wherein said sleeve includes a keyway, said first hollow tubular body includes a keyway, and a key is positioned in said keyways to lock said sleeve in position with respect to said first hollow tubular body.

References Cited in the file of this patent

UNITED STATES PATENTS

| | | |
|---|---|---|
| 669,020 | Boekel | Feb. 26, 1901 |
| 674,833 | Boekel | May 21, 1901 |
| 1,303,851 | Carlson | May 20, 1919 |
| 1,437,201 | Schumann | Nov. 28, 1922 |
| 1,460,561 | Peterson | July 3, 1923 |
| 1,767,560 | Snyder | June 24, 1930 |
| 1,796,130 | Szodomka | Mar. 10, 1931 |
| 1,819,116 | Preble | Aug. 18, 1931 |
| 1,952,236 | Clawson | Mar. 27, 1934 |

FOREIGN PATENTS

| | | |
|---|---|---|
| 311,893 | Germany | May 10, 1919 |